US008640122B2

(12) United States Patent
DeHaan

(10) Patent No.: US 8,640,122 B2
(45) Date of Patent: Jan. 28, 2014

(54) SYSTEMS AND METHODS FOR ABSTRACTING SOFTWARE CONTENT MANAGEMENT IN A SOFTWARE PROVISIONING ENVIRONMENT

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 1183 days.

(21) Appl. No.: 12/395,273

(22) Filed: Feb. 27, 2009

(65) Prior Publication Data
US 2010/0223607 A1  Sep. 2, 2010

(51) Int. Cl.
*G06F 9/445* (2006.01)

(52) U.S. Cl.
USPC ........... 717/174; 717/175; 717/177; 717/178; 709/226

(58) Field of Classification Search
USPC .................... 717/168–178; 707/769; 709/226
See application file for complete search history.

(56) References Cited

U.S. PATENT DOCUMENTS

| | | | |
|---|---|---|---|
| 5,787,246 A | 7/1998 | Lichtman et al. |
| 5,835,719 A | 11/1998 | Gibson et al. |
| 5,948,062 A | 9/1999 | Tzelnic et al. |
| 6,105,100 A | 8/2000 | Dean et al. |
| 6,212,585 B1 | 4/2001 | Chrabaszcz |
| 6,243,747 B1 | 6/2001 | Lewis et al. |
| 6,272,536 B1 | 8/2001 | van Hoff et al. |
| 6,381,742 B2 | 4/2002 | Forbes et al. |
| 6,415,289 B1 | 7/2002 | Williams et al. |
| 6,438,711 B2 | 8/2002 | Woodruff |
| 6,516,427 B1 | 2/2003 | Keyes et al. |
| 6,526,442 B1 | 2/2003 | Stupek et al. |
| 6,550,021 B1 | 4/2003 | Dalphy et al. |
| 6,557,169 B1 | 4/2003 | Erpeldinger |
| 6,594,664 B1 | 7/2003 | Estrada et al. |
| 6,625,742 B1 | 9/2003 | Owhadi et al. |
| 6,686,838 B1 | 2/2004 | Rezvani et al. |
| 6,751,659 B1 | 6/2004 | Fenger et al. |
| 6,757,837 B1 | 6/2004 | Platt et al. |
| 6,769,022 B1 | 7/2004 | DeKoning et al. |
| 6,779,004 B1 | 8/2004 | Zintel |
| 6,845,464 B2 | 1/2005 | Gold |
| 6,865,737 B1 | 3/2005 | Lucas et al. |
| 6,947,939 B2 | 9/2005 | Fujibayashi et al. |
| 6,986,033 B2 | 1/2006 | Miyamoto et al. |
| 7,013,461 B2 | 3/2006 | Hellerstein et al. |
| 7,051,101 B1 | 5/2006 | Dubrovsky et al. |
| 7,107,330 B1 | 9/2006 | Hamilton et al. |

(Continued)

OTHER PUBLICATIONS

Doc Searls "Linux for Suits", 2005, Specialized System Consultants Inc., vol. 2005.

(Continued)

*Primary Examiner* — Lewis A Bullock, Jr.
*Assistant Examiner* — Tina Huynh
(74) *Attorney, Agent, or Firm* — Lowenstein Sandler LLP

(57) ABSTRACT

To provision software content from the different software repositories and manage updates to the repositories, a provisioning server can maintain a repository record. The repository record can include an identification of the repositories associated with the provisioning server. Additionally, the repository record can associate, with each identification of a repository, the type of repository, the software content contained in the repository, and provisioning objects associated with the software content contained in the repository. The provisioning server can be configured to utilize the repository record during provisioning processes for software content and for updating software content of target machines.

12 Claims, 4 Drawing Sheets

(56) References Cited

U.S. PATENT DOCUMENTS

| | | | |
|---|---|---|---|
| 7,133,822 B1 | 11/2006 | Jacobson | |
| 7,165,109 B2 | 1/2007 | Chiloyan et al. | |
| 7,185,071 B2 | 2/2007 | Berg et al. | |
| 7,200,845 B2 | 4/2007 | Morrison et al. | |
| 7,340,637 B2 | 3/2008 | Nagoya | |
| 7,350,112 B2 | 3/2008 | Fox et al. | |
| 7,356,679 B1 | 4/2008 | Le et al. | |
| 7,395,322 B2 | 7/2008 | Harvey et al. | |
| 7,506,040 B1 | 3/2009 | Rabe et al. | |
| 7,506,151 B2 | 3/2009 | Miyamoto et al. | |
| 7,516,218 B2 | 4/2009 | Besson | |
| 7,519,691 B2 | 4/2009 | Nichols et al. | |
| 7,574,481 B2 | 8/2009 | Moore et al. | |
| 7,600,005 B2 | 10/2009 | Jamkhedkar et al. | |
| 7,606,868 B1 | 10/2009 | Le et al. | |
| 7,640,325 B1 | 12/2009 | DeKoning et al. | |
| 7,681,080 B2 | 3/2010 | Abali et al. | |
| 7,716,316 B2 | 5/2010 | Nichols et al. | |
| 7,734,717 B2 | 6/2010 | Saarimaki et al. | |
| 7,827,261 B1 | 11/2010 | Griswold et al. | |
| 7,831,997 B2 | 11/2010 | Eldar et al. | |
| 7,937,437 B2 | 5/2011 | Fujii | |
| 2002/0062259 A1 | 5/2002 | Katz et al. | |
| 2002/0078186 A1 | 6/2002 | Engel et al. | |
| 2002/0138567 A1 | 9/2002 | Ogawa | |
| 2002/0162028 A1 | 10/2002 | Kennedy | |
| 2003/0005097 A1 | 1/2003 | Barnard et al. | |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0097422 A1* | 5/2003 | Richards et al. | 709/217 |
| 2003/0110173 A1 | 6/2003 | Marsland | |
| 2003/0119480 A1 | 6/2003 | Mohammad | |
| 2003/0126585 A1 | 7/2003 | Parry | |
| 2003/0195921 A1* | 10/2003 | Becker et al. | 709/200 |
| 2003/0212992 A1 | 11/2003 | Ronning et al. | |
| 2004/0006616 A1 | 1/2004 | Quinn et al. | |
| 2004/0015831 A1 | 1/2004 | Bowhill | |
| 2004/0015957 A1 | 1/2004 | Zara et al. | |
| 2004/0019876 A1 | 1/2004 | Dravida et al. | |
| 2004/0024984 A1 | 2/2004 | Lanzatella et al. | |
| 2004/0044643 A1 | 3/2004 | deVries et al. | |
| 2004/0054789 A1 | 3/2004 | Breh et al. | |
| 2004/0059703 A1 | 3/2004 | Chappell et al. | |
| 2004/0064501 A1 | 4/2004 | Jan et al. | |
| 2004/0128375 A1 | 7/2004 | Rockwell | |
| 2004/0143664 A1 | 7/2004 | Usa et al. | |
| 2004/0167975 A1 | 8/2004 | Hwang et al. | |
| 2004/0215755 A1 | 10/2004 | O'Neill | |
| 2004/0223469 A1 | 11/2004 | Bahl et al. | |
| 2005/0015748 A1* | 1/2005 | Zatloukal | 717/114 |
| 2005/0028025 A1 | 2/2005 | Zalewski et al. | |
| 2005/0050175 A1 | 3/2005 | Fong et al. | |
| 2005/0114474 A1 | 5/2005 | Anderson et al. | |
| 2005/0125525 A1 | 6/2005 | Zhou et al. | |
| 2005/0172283 A1* | 8/2005 | Delo | 717/174 |
| 2005/0177829 A1 | 8/2005 | Vishwanath | |
| 2005/0182796 A1 | 8/2005 | Chu et al. | |
| 2005/0198629 A1* | 9/2005 | Vishwanath | 717/174 |
| 2005/0223374 A1 | 10/2005 | Wishart et al. | |
| 2006/0041767 A1 | 2/2006 | Maxwell et al. | |
| 2006/0080659 A1 | 4/2006 | Ganji | |
| 2006/0095230 A1 | 5/2006 | Grier et al. | |
| 2006/0095702 A1 | 5/2006 | Hickman et al. | |
| 2006/0155857 A1 | 7/2006 | Feenan et al. | |
| 2006/0173912 A1 | 8/2006 | Lindvall et al. | |
| 2006/0174018 A1 | 8/2006 | Zhu et al. | |
| 2006/0190575 A1 | 8/2006 | Harvey et al. | |
| 2006/0190773 A1 | 8/2006 | Rao et al. | |
| 2006/0200658 A1 | 9/2006 | Penkethman | |
| 2006/0215575 A1 | 9/2006 | Horton et al. | |
| 2006/0218544 A1 | 9/2006 | Chakraborty et al. | |
| 2006/0230165 A1 | 10/2006 | Zimmer et al. | |
| 2006/0282479 A1* | 12/2006 | Johnson et al. | 707/203 |
| 2007/0015538 A1 | 1/2007 | Wang | |
| 2007/0067419 A1 | 3/2007 | Bennett | |
| 2007/0101118 A1 | 5/2007 | Raghunath et al. | |
| 2007/0118654 A1 | 5/2007 | Jamkhedkar et al. | |
| 2007/0168721 A1 | 7/2007 | Luiro et al. | |
| 2007/0169093 A1 | 7/2007 | Logan et al. | |
| 2007/0192158 A1 | 8/2007 | Kim | |
| 2007/0204338 A1 | 8/2007 | Aiello et al. | |
| 2007/0226810 A1 | 9/2007 | Hotti | |
| 2007/0244996 A1 | 10/2007 | Ahmed et al. | |
| 2007/0276905 A1 | 11/2007 | Durand et al. | |
| 2007/0288612 A1 | 12/2007 | Hall | |
| 2007/0294376 A1 | 12/2007 | Ayachitula et al. | |
| 2007/0299951 A1 | 12/2007 | Krithivas | |
| 2008/0028048 A1 | 1/2008 | Shekar et al. | |
| 2008/0040452 A1 | 2/2008 | Rao et al. | |
| 2008/0046708 A1 | 2/2008 | Fitzgerald et al. | |
| 2008/0059959 A1 | 3/2008 | Chen et al. | |
| 2008/0130639 A1 | 6/2008 | Costa-Requena et al. | |
| 2008/0189693 A1 | 8/2008 | Pathak | |
| 2008/0196043 A1 | 8/2008 | Feinleib et al. | |
| 2008/0235266 A1 | 9/2008 | Huang et al. | |
| 2008/0235361 A1 | 9/2008 | Crosbie et al. | |
| 2008/0244325 A1 | 10/2008 | Tyulenev | |
| 2008/0270674 A1 | 10/2008 | Ginzton | |
| 2008/0294777 A1* | 11/2008 | Karve et al. | 709/226 |
| 2008/0301666 A1 | 12/2008 | Gordon et al. | |
| 2008/0313716 A1 | 12/2008 | Park | |
| 2008/0320110 A1 | 12/2008 | Pathak | |
| 2009/0007091 A1* | 1/2009 | Appiah et al. | 717/171 |
| 2009/0055901 A1 | 2/2009 | Kumar et al. | |
| 2009/0064132 A1 | 3/2009 | Suchy et al. | |
| 2009/0089567 A1 | 4/2009 | Boland et al. | |
| 2009/0089852 A1 | 4/2009 | Randolph et al. | |
| 2009/0106291 A1 | 4/2009 | Ku et al. | |
| 2009/0129597 A1 | 5/2009 | Zimmer et al. | |
| 2009/0132682 A1 | 5/2009 | Counterman | |
| 2009/0132710 A1 | 5/2009 | Pelley | |
| 2009/0158148 A1 | 6/2009 | Vellanki et al. | |
| 2009/0158272 A1 | 6/2009 | El-Assir et al. | |
| 2009/0164522 A1 | 6/2009 | Fahey | |
| 2009/0165099 A1 | 6/2009 | Eldar et al. | |
| 2009/0172430 A1 | 7/2009 | Takenouchi | |
| 2009/0240835 A1 | 9/2009 | Adelman et al. | |
| 2009/0259665 A1 | 10/2009 | Howe et al. | |
| 2009/0265707 A1 | 10/2009 | Goodman et al. | |
| 2009/0282404 A1 | 11/2009 | Khandekar et al. | |
| 2009/0285199 A1 | 11/2009 | Strahs et al. | |
| 2010/0023740 A1 | 1/2010 | Moon et al. | |
| 2010/0100876 A1 | 4/2010 | Glover et al. | |
| 2010/0217837 A1 | 8/2010 | Ansari et al. | |
| 2010/0220584 A1 | 9/2010 | DeHaan et al. | |
| 2010/0223504 A1 | 9/2010 | DeHaan et al. | |
| 2010/0223608 A1 | 9/2010 | DeHaan et al. | |
| 2010/0223609 A1 | 9/2010 | DeHaan et al. | |

OTHER PUBLICATIONS eBook "Microsoft System Management Server 2003 Administrator's companion", Microsoft Press, c2004, Ch. 13, Patch Management, pp. 471-507.

Butt et al., "Automated Installation of Large-Scale Linux Networks", 2000.

Anderson et al., "Technologies for Large-Scale Configuration Management", Dec. 9, 2002.

Grosse, "Repository Mirroring", 1995.

HP Storage Essentials SRM 6.0 Installation Guide. Jan. 2008. HP. 1st ed. Part No. T4283-96113. pp. 1-5, 97-136, 219-228.

(56) References Cited

OTHER PUBLICATIONS

HP Storage Essentials SRM 6.0 User Guide. Jan. 2008. HP. 1st ed. Part No. T4238-96114. pp. 1-83.
Michael DeHaan. "Unfiled Provisioning". 2007.
Michael DeHaan. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems using IBM TotalStorage Productivity Center. Sep. 2005. IBM. 2nd ed. SG24-7097-01. pp. 1-42.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, filed Nov. 30, 2009.
Henson, "Systems and Methods for Mounting Specified Storage Resources from Storage Area Network in Machine Provisioning Platform", U.S. Appl. No. 12/627,988, filed Nov. 30, 2009.

* cited by examiner

SYSTEMS AND METHODS FOR ABSTRACTING SOFTWARE CONTENT MANAGEMENT IN A SOFTWARE PROVISIONING ENVIRONMENT

FIELD

This invention relates generally to software provisioning. In particular, the invention relates to systems and methods for software in a software provisioning environment.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

For large datacenters, multiple installer servers will be utilized in order to deliver different software from different types of software repositories. Typically, each installer server is only able to install software for one type of repository.

BRIEF DESCRIPTION OF THE DRAWINGS

Various features of the embodiments can be more filly appreciated, as the same become better understood with reference to the following detailed description of the embodiments when considered in connection with the accompanying figures, in which.

DETAILED DESCRIPTION OF EMBODIMENTS

Figure 1:
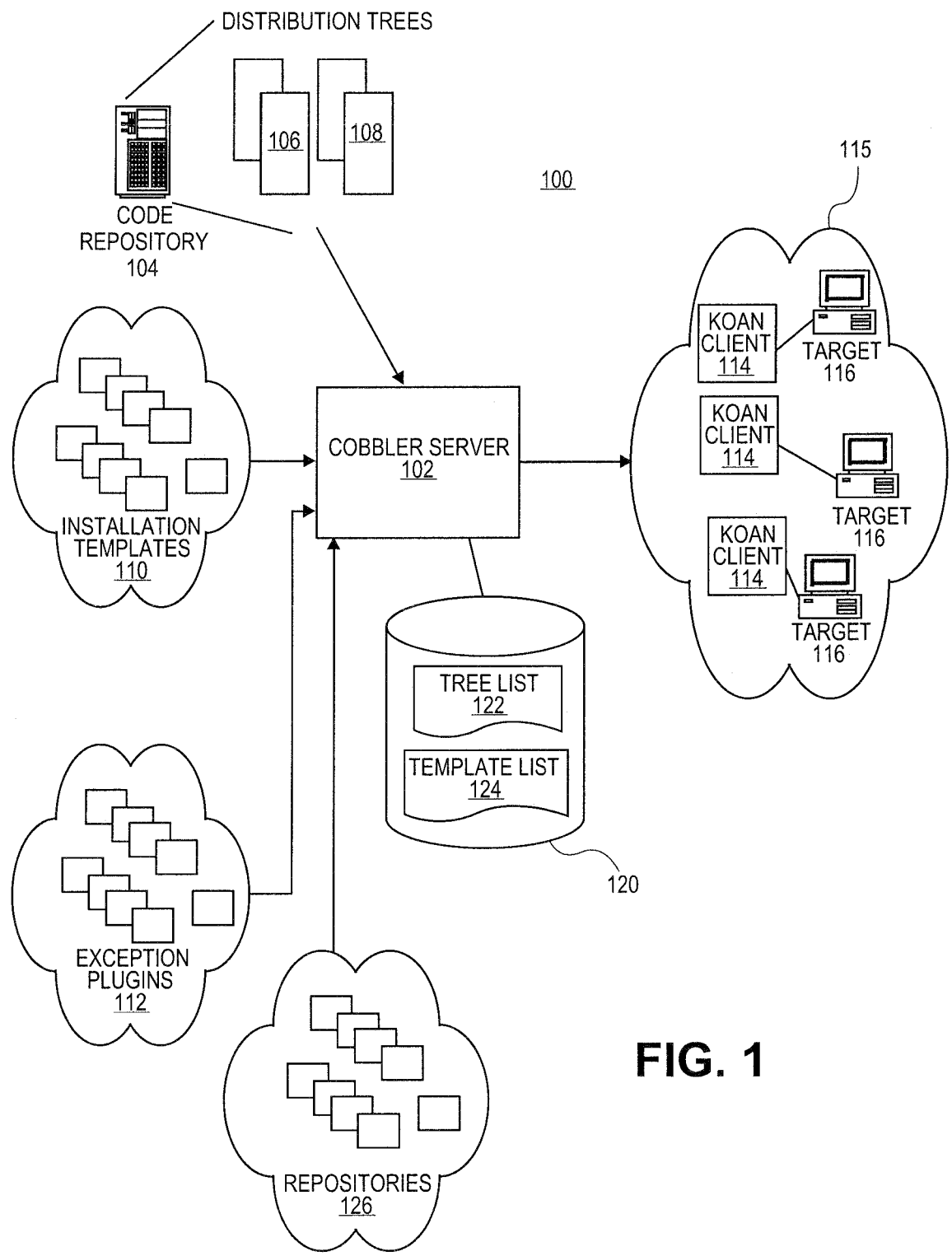
FIG. 1 illustrates an overall provisioning environment in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for provisioning software in a software provisioning environment. More particularly, a provisioning server can manage multiple types of software repositories in order to provision software content from the different types of software repositories and manage updates to the repositories.

According to embodiments, the provisioning server can be associated with multiple and different types of software repositories. To provision software content from the different software repositories and manage updates to the repositories, the provisioning server can be configured to maintain a repository record. The repository record can be configured to include an identification of the repositories associated with the provisioning server. Additionally, the repository record can be configured to associate, with each identification of a repository, the type of repository, the software content contained in the repository, and provisioning objects associated with the software content contained in the repository.

In embodiments, the provisioning server can be configured to utilize the repository record during provisioning processes. As the provisioning server performs a provisioning process according to a particular provisioning object, the provisioning server can be configured to examine the repository record to identify the software repository associated with the provisioning object or with the software content related to the provisioning object. Accordingly, the provisioning server can be configured to retrieve the necessary software content from the identified repository to perform the provisioning process.

In embodiments, the provisioning server can be configured to utilize the repository record to manage and propagate updates to software content in the software repositories. When software content in a particular software repository are updated, the provisioning server can be configured to search the repository record to identify the provisioning objects associated with the particular software repository and software content updates, and thereby affected by the software content updates. Once identified, the provisioning server can be configured to provide the software content updates to any target machines associated with the identified provisioning object. Additionally, if the identified provisioning object is itself affected by the software content updates, the provisioning server can be configured to update the provisioning object according to the software content updates.

By maintaining a record of the repositories, the provisioning server can support multiple software repositories. Also, the provisioning server can easily and efficiently map software content updates to the appropriate target machines.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 can be implemented using well known components of hardware and software. Additionally, the code repository 104 can include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile further. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [--arg1=] [--arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 and U.S. patent application Ser. No. 11/763,333, U.S. Patent Publication No. 2008-0288939, all assigned to Red Hat Corporation, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108.

A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing an rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default, systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and can then initiate installation of the software being provisioned. Additionally, the koan client 114 can either install the requested software, e.g., replace the existing operating system, or install a virtual machine.

Figure 2:
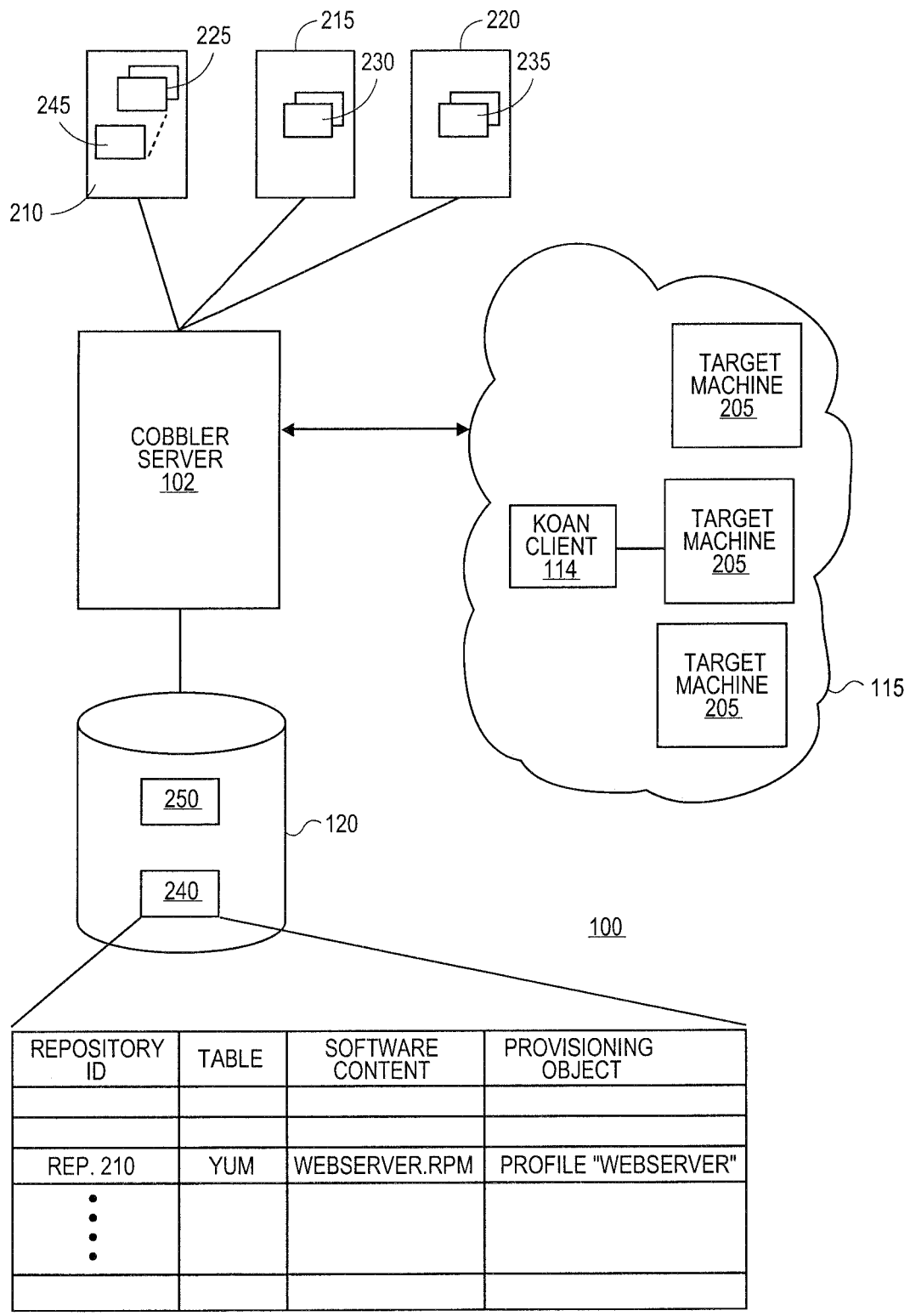
FIG. 2 illustrates the overall provisioning environment in which a provisioning server can manage multiple types of software repositories, according to various embodiments.

FIG. 2 illustrates aspects of the provisioning environment 100 that allows the provisioning of virtual images, according to embodiments. In embodiments as shown, the cobbler server 102 can be coupled to a network 115 and a provisioning database 120 to provide provisioning processes and other actions related to provisioning to target machines 205 in the network 115. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target machines 205. For example, the target machines 205 can include computing systems such as servers, personal computers, laptop computers, etc. In embodiments, the target machines 205 can include hardware typically found in conventional computing systems (processors, memory, video cards, network interface cards, storage devices, and the like). One skilled in the art will realize that network 115 can include any number of target machines 205.

In embodiments, the cobbler server 102 can be coupled to one or more software or "code" repositories 210, 215, and 220. The repositories 210, 215, and 220 can be configured to store one or more sets of software content 225, 230, and 235, respectively. Each software distribution in sets of software content 225, 230, and 235 can include any number and type of applications and OS, whether open-source or proprietary, such as software content described above in FIG. 1. Additionally, each set of the sets of the software content 225, 230, and 235, maintained by the respective repositories 210, 215, and 220, can include the same or different software content.

In embodiments, the repositories 210, 215, and 220 can be implemented using any type of systems and tools to maintain, manage, and provide software content, such as "yum", advanced packaging tool (APT), Solaris™ and the like. Additionally, the repositories 210, 215, and 220 can be implemented using different types of systems and tools. For example, the repositories 210 and 215 can be implemented using "yum" and the repository 220 can be implemented using APT.

In embodiments, the cobbler server 102 can be configured to provide provisioning processes for the sets of software content 225, 230, and 235 utilizing provisioning objects as described above. In the provisioning processes for software content, the cobbler server 102 can install particular software content on a target machine 205 utilizing the provisioning objects such as profiles, templates, system records including the target machine information, etc., as described above.

In embodiments, the provisioning objects can include all the data required by a cobbler server 102 to perform the software provisioning processes, such as the process described above, supported by the cobbler server 102. For example, the provisioning objects can include software distributions; configuration templates (templates for generating configuration files, such as kickstart files); distribution profile information (mapping a distribution to profile; a configuration template or a configuration file, and additional preferences, such as kernel options, template variables, or virtual machine settings); target machine information (information representing the mapping of a physical piece of hardware, plus hardware specific customizations, to a profile that it should run); repos information (information representing external or internal software repositories stored on the cobbler server); images (such as distributions representing an undefined executable image (like "memtest"); a virtual machine to be cloned, or an ISO file for use in installing a virtual machine); and the like.

In embodiments, to provision the sets of software content 225, 230, and 235 from the repositories 210, 215, and 220 and manage updates to the repositories 210, 215, and 220, the cobbler server 102 can be configured to maintain a repository record 240. The repository record 240 can be configured to associate the provisioning objects, supported by the cobbler server 102, with one or more repository of the repositories 210, 215, and 220 related to the provisioning object. The cobbler server 102 can be configured to maintain the repository record 240 in the provisioning database 120.

In embodiments, the repository record 240 can be configured to include an identification of the repositories 210, 215, and 220, for example, the name, access information, and location information of the the repositories 210, 215, and 220. Additionally, the repository record 240 can be configured to associate, with each identification of the repositories 210, 215, and 220, the type of the repositories 210, 215, and 220, the software content contained in the repositories 210, 215, and 220, and the provisioning objects associated with the software content contained in the repositories 210, 215, and 220.

In embodiments, the cobbler server 102 can be configured to utilize the repository record 240 during provisioning processes. As the cobbler server 102 performs a provisioning process according to a particular provisioning object, the cobbler server 102 can be configured to examine the repository record 240 to identify the particular software repository from the repositories 210, 215, and 220 associated with the provisioning object or with the software distribution related to the provisioning object. Accordingly, the cobbler server 102 can be configured to retrieve the necessary software distribution from the identified software repository to perform the provisioning process.

In embodiments, for example, the cobbler server 102 can initiate a provisioning process for a profile of a "webserver" on a target machine 205. Upon initiating the provisioning process, the cobbler server 102 can examine the repository record 240 to determine the particular software repository from the repositories 210, 215, and 220 associated with the profile "webserver". For instance, the repository record 240 can associate the profile "webserver" with software content 245 in the set of software content 225 contained in the repository 210. Accordingly, the cobbler server 102 can retrieve the software content 245 from the software repository 210 to perform the provisioning process on the target machine 205.

In embodiments, the cobbler server 102 can be configured to utilize the repository record 240 to manage and propagate updates to the set of software content 225, 230, and 235 in the repositories 210, 215, and 220. When software content in a particular repository 210, 215, or 220 are updated, the cobbler server 102 can be configured to examine the repository record 240 to identify the provisioning objects associated with the particular software repository, and thereby affected by the software content updates.

In embodiments, once identified, the cobbler server 102 can be configured to perform provisioning processes for the software content updates on any target machines 205 associated with the identified provisioning object. To enable this, the cobbler server 102 can maintain an inventory record 250 in the provisioning database 120. The inventory record 250 can be configured to include an identification of the target machines 205 and the provisioning object associated with the target machines 205. Additionally, if the identified provisioning object is itself affected by the software content updates, the cobbler server 102 can be configured to update the provisioning object according to the software content updates.

In embodiments, for example, the software content 245 in the repository 210 can receive an update such as an update to application or OS contained in the software content 245. In response to the update, the cobbler server 102 can examine the repository record 240 to identify the provisioning object, for example the profile "webserver", is associated with the repository 210 and the software content 245. Additionally, once identified, the cobbler server 102 can examine the inventory record 250 to determine one or more target machines 205 associated with the identified provisioning object, the profile "webserver". Then, the cobbler server 102 can retrieve the software content 245 updates and initiate a provisioning process to provide the software content 245 updates to the identified target machine 205.

In embodiments, in this example, the cobbler server 102 can also be configured to update the provisioning object, e.g. the profile "webserver", if required by the software content 245 updates. For instance, the cobbler server 102 can update other provisioning objects and parameters associated with the profile "webserver", such as configuration temples, in order to properly perform the provisioning processes for the software content 245 updates.

Figure 3:
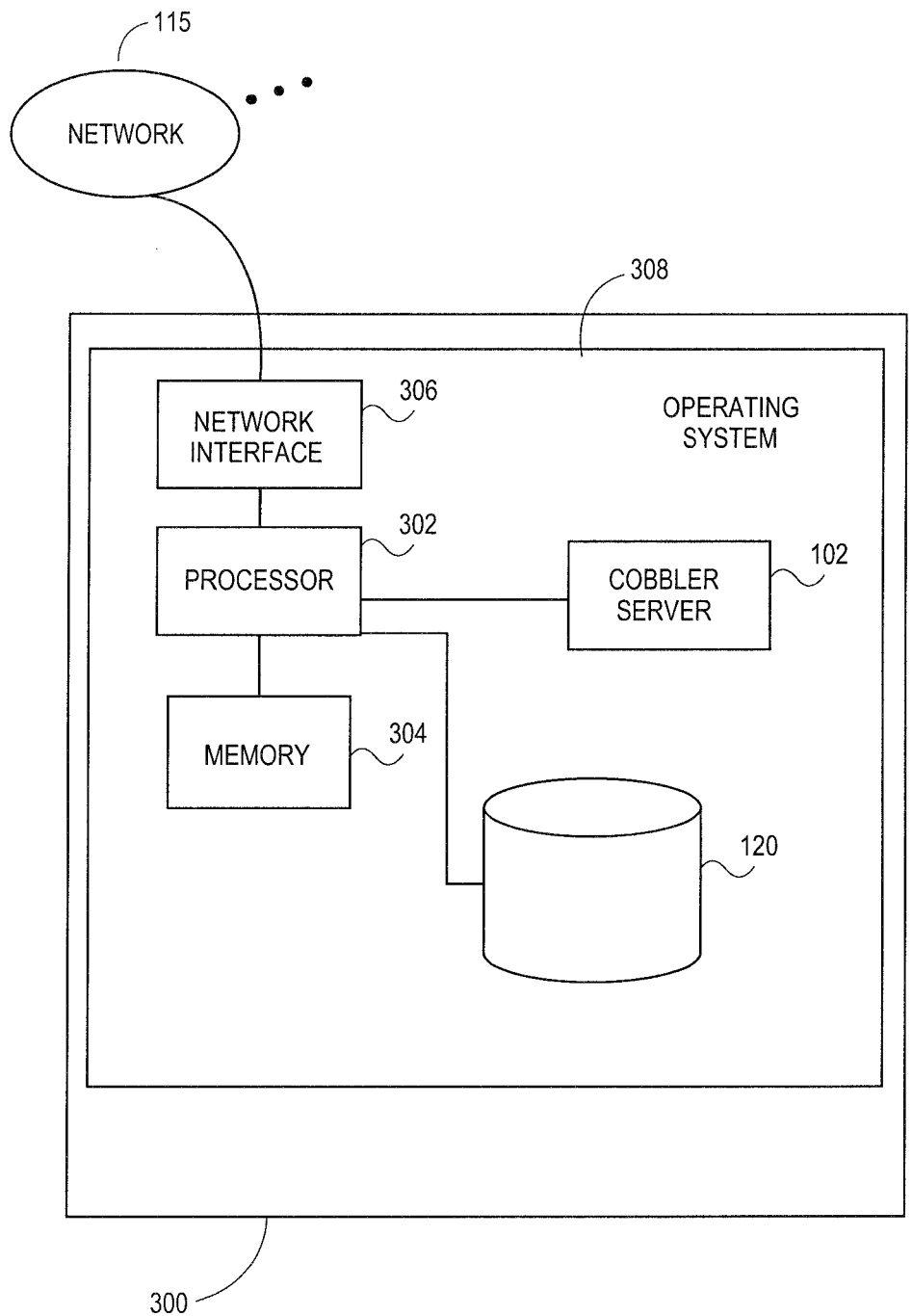
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115, and execute the cobbler server 102 according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, the Unix™ operating system, or other open-source or proprietary operating system or platform. Processor 302 also communicates with the provisioning database 120, such as a database stored on a local hard drive. While illustrated as a local database in computing system 300, the provisioning database 120 can be separate from the computing system 300 and the cobbler server 102 can be configured to communicate with the remote provisioning database 120.

Processor 302 further communicates with network interface 306, such as an Ethernet or wireless data connection, which in turn communicates with one or more networks 115, such as the Internet or other public or private networks. Processor 302 also communicates with the provisioning database 120, and the cobbler server 102, to execute control logic and perform the provisioning processes, described above and below.

As illustrated, the cobbler server 102 can be implemented as a software application or program capable of being executed by a conventional computer platform. Likewise, the cobbler server 102 can also be implemented as a software module or program module capable of being incorporated in other software applications and programs. In either case, the cobbler server 102 can be implemented in any type of conventional proprietary or open-source computer language.

Figure 4:
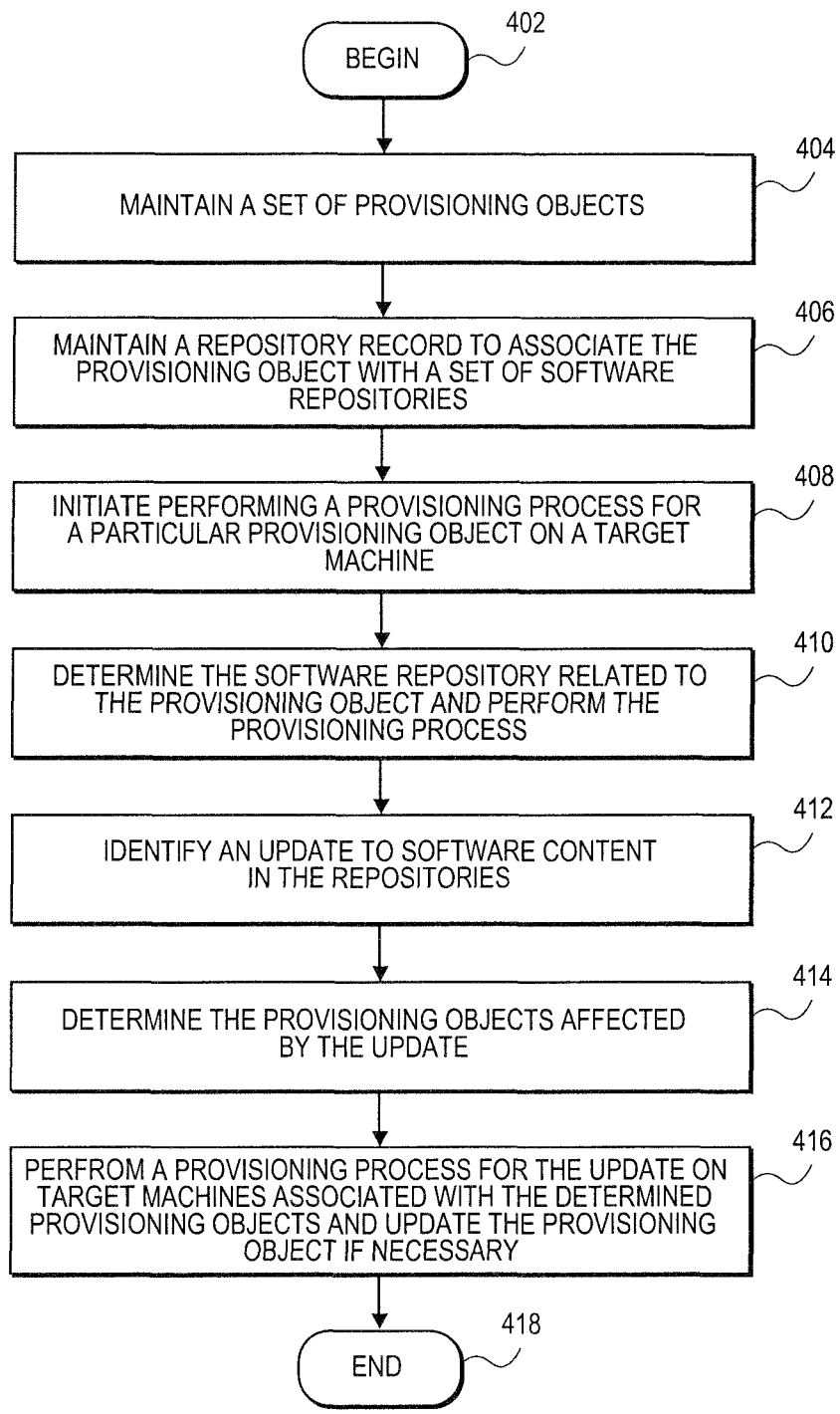
FIG. 4 illustrates a flowchart for managing multiple types of software repositories, according to various embodiments.

FIG. 4 illustrates a flow diagram for integrating provisioning processes and configuration management in the provisioning environment 100, according to embodiments of the present teachings. In 402, the process can begin. In 404, the cobbler server 102 can maintain a set of provisioning objects. The provisioning objects can include all the data required by a cobbler server 102 to perform the software provisioning processes, such as the process described above, supported by the cobbler server 102.

In 406, the cobbler server 102 can maintain a repository record 240. The repository record 240 can be configured to include an identification of the repositories 210, 215, and 220, for example, the name, access information, and location information of the the repositories 210, 215, and 220. Additionally, the repository record 240 can be configured to associate, with each identification of the repositories 210, 215, and 220, the type of the repositories 210, 215, and 220, the software content contained in the repositories 210, 215, and 220, and the provisioning objects associated with the software content contained in the repositories 210, 215, and 220.

In 408, the cobbler server 102 can initiate performing a provisioning process for a particular provisioning object on a target machine 205. The cobbler server 102 can initiate the provisioning process upon the occurrence of any event, such as a request to perform the provisioning process, addition of a new target machine, change in resources of the target machine, and the like. The cobbler server 102 can perform any type of provisioning processes that can be associated with a provisioning object, for example, provisioning software content to a target machine 205 according to a profile.

In 410, the cobbler server 102 can determine the software repository related to the provisioning object and perform the provisioning process. For example, the cobbler server 102 can examine the repository record 240 to identify the particular software repository from the repositories 210, 215, and 220 associated with the provisioning object or with the software content related to the provisioning object. Accordingly, the cobbler server 102 can retrieve the necessary software content from the identified software repository to perform the provisioning process.

In 412, the cobbler server 102 can identify an update to software content in the repositories 210, 215, and 220. For example, the cobbler server 102 can examine the set of repositories to determine if any of the set of content 225, 230, and 235 has been updated. Additionally, the cobbler server 102 can receive an indication from the repositories 210, 215, and 220 or any other source that one or more of the set of content 225, 230, and 235 has been updated.

In 414, the cobbler server 102 can determine the provisioning objects affected by the update. The cobbler server 102 can examine the repository record 240 to identify the provisioning objects associated with the particular software repository, and thereby affected by the software content updates.

In 416, the cobbler server 102 can perform a provisioning process for the update on target machines 102 associated with the determined provisioning objects and update the provisioning object, if necessary. The cobbler server 102 can maintain the inventory record 250 in the provisioning database 120. The inventory record 250 can be configured to include an identification of the target machines 205 and the provisioning object associated with the target machines 205. Additionally, if the identified provisioning object is itself affected by the software content updates, the cobbler server 102 can update the provisioning object according to the software content updates.

In 418, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
maintaining, by a processor, a repository record, wherein the repository record comprises an identification of a plurality of software repositories, an identification of a plurality of software content associated with each software repository of the plurality of software repositories, and an identification of one or more provisioning objects of a plurality of provisioning objects associated with each software repository of the plurality of software repositories, wherein a first software repository of the plurality of software repositories uses a first type of system to maintain software content associated with the first software repository and a second repository of the plurality of software repositories uses a second type of system to maintain software content associated with the second software repository;

initiating, by the processor, a provisioning process on a target machine in a network of target machines for a provisioning object of the plurality of provisioning objects;

examining, by the processor, the repository record to determine a target repository of the plurality of software repositories for obtaining target software content of the plurality of software content associated with the provisioning object;

performing, by the processor, the provisioning process utilizing the target software content;

identifying, by the processor, an update to software content associated with one or more of the plurality of software repositories;

determining, by the processor, whether the provisioning object is affected by the update to the software content associated with the one or more of the plurality of software repositories; and in response to determining that the provisioning object is affected by the update to the software content associated with the one or more of the plurality of software repositories, performing, by the processor, an update provisioning process on the target machine and updating the provisioning object.

2. The method of claim 1, the method further comprising:
retrieving the target software content from the target repository prior to performing the provisioning process.

3. The method of claim 1, wherein the provisioning process comprises installing the target software content on the target machine.

4. The method of claim 1, wherein the plurality of provisioning objects comprises at least one of a profile for the provisioning process, a template for the provisioning process, a software content record for the provisioning process, and or an inventory record for the target machine.

5. The method of claim 1, wherein updating the provisioning object comprises:
altering the provisioning object in view of the update to the software content associated with the one or more of the plurality of software repositories.

6. The method of claim 1, wherein the plurality of software repositories comprise different types of software repositories.

7. A system, comprising:
a network interface to a network of target machines; and
a provisioning server, communicating with the network interface and a plurality of software repositories, the provisioning server to:
maintain a repository record, wherein the repository record comprises an identification of the plurality of software repositories, an identification of a plurality of software content associated with each software repository of the plurality of software repositories, and an identification of one or more provisioning objects in a plurality of provisioning objects associated with each software repository of the plurality of software repositories, wherein a first software repository of the plurality of software repositories uses a first type of system to maintain software content associated with the first software repository and a second repository of the plurality of software repositories uses a second type of system to maintain software content associated with the second software repository;

initiate a provisioning process on a target machine in the network of target machines for a provisioning object of the plurality of provisioning objects;

examine the repository record to determine a target repository of the plurality of software repositories for obtaining target software content of the plurality of software content associated with the provisioning object;

perform the provisioning process utilizing the target software content;

identify an update to software content associated with one or more of the plurality of software repositories;

determine whether the provisioning object is affected by the update to the software content associated with the one or more of the plurality of software repositories; and in response to determining that the provisioning object is affected by the update to the software content associated with the one or more of the plurality of software repositories, perform an update provisioning process on the target machine and update the provisioning object.

8. The system of claim 7, the provisioning server further to:
retrieve the target software content from the target repository prior to performing the provisioning process.

9. The system of claim 7, wherein the provisioning process comprises installing the target software content on the target machine.

10. The system of claim 7, wherein the plurality of provisioning objects comprises at least one of a profile for the provisioning process, a template for the provisioning process, a software content record for the provisioning process, and or an inventory record for the target machine.

11. The system of claim 7, wherein to update the provisioning object, the provisioning server is to:
alter the provisioning object in view of the update to the software content associated with the one or more of the plurality of software repositories.

12. The system of claim 7, wherein the plurality of software repositories comprise different types of software repositories.

* * * * *

UNITED STATES PATENT AND TRADEMARK OFFICE
CERTIFICATE OF CORRECTION

PATENT NO. : 8,640,122 B2
APPLICATION NO. : 12/395273
DATED : January 28, 2014
INVENTOR(S) : Michael Paul DeHaan Page 1 of 1

It is certified that error appears in the above-identified patent and that said Letters Patent is hereby corrected as shown below:

In the Claims

In claim 4, column 12, line 41: "a software content record for the provisioning process, and or"

should be: "a software content record for the provisioning, or"

In claim 10, column 14, line 13: "a software content record for the provisioning process, and or"

should be: "a software content record for the provisioning, or"

Signed and Sealed this
Twenty-third Day of September, 2014

Michelle K. Lee
*Deputy Director of the United States Patent and Trademark Office*